Figure 1:
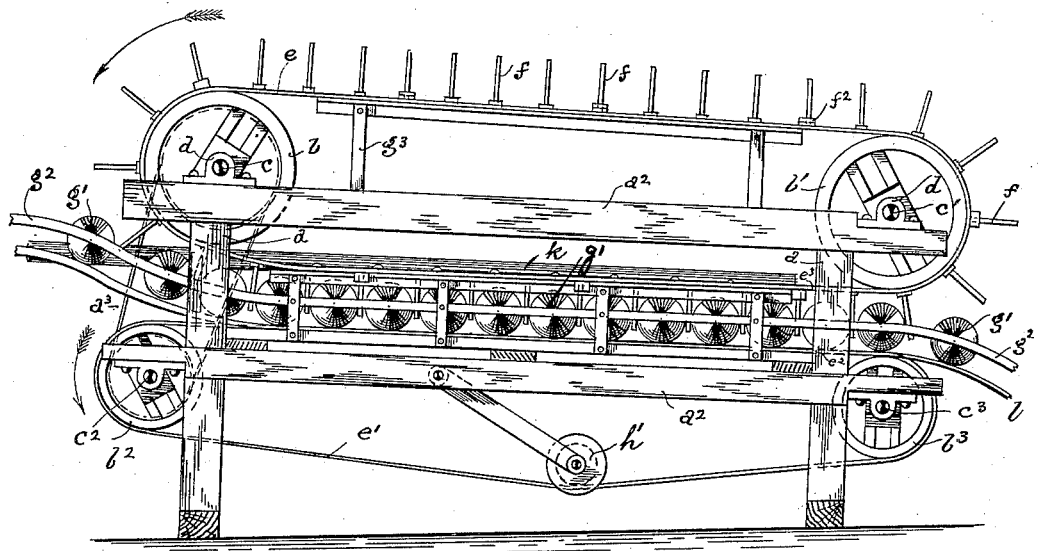

(No Model.) 2 Sheets—Sheet 1.

C. B. KENDALL.
CAN COOLING MACHINERY.

No. 469,389. Patented Feb. 23, 1892.

Witnesses.
H. E. Monteverde
Jno. F. Uhlhorn

Inventor.
Charles B. Kendall
By Boone & Acker
attys.

(No Model.) 2 Sheets—Sheet 2.

C. B. KENDALL.
CAN COOLING MACHINERY.

No. 469,389. Patented Feb. 23, 1892.

Witnesses.

Inventor.
Charles B. Kendall
By Boone & Acker
attys.

UNITED STATES PATENT OFFICE.

CHARLES B. KENDALL, OF NEWTON, MASSACHUSETTS.

CAN-COOLING MACHINERY.

SPECIFICATION forming part of Letters Patent No. 469,389, dated February 23, 1892.

Application filed November 8, 1890. Renewed December 29, 1891. Serial No. 416,492. (No model.)

*To all whom it may concern:*

Be it known that I, CHARLES B. KENDALL, a citizen of the United States, residing at Newton, in the county of Middlesex and State of Massachusetts, have invented certain new and useful Improvements in Can-Cooling Machinery; and I do hereby declare the following to be a full, clear, and exact description of said invention, such as will enable others skilled in the art to which it most nearly appertains to make, use, and practice the same.

My invention has relation to certain new and useful improvements in can-cooling machinery, which consists of the arrangement of parts and details of construction, as will be hereinafter more fully set forth in the drawings, described, and pointed out in the specification. Heretofore in the cooling of the cans as they come from the solder bath, in order to solidify the solder, it has been customary to cause the same to rotate upon a runway of considerable length and to create the cooling by atmospheric influences; but inasmuch as the can-bodies are pressed one against the other during their line of travel the solder while in its molten state is caused to spread or run from its seam, thus when cooled creating an imperfect seam.

My invention consists, first, in reducing the runway so as utilize the least possible room, which is an essential feature in the manufacture of cans; second, in providing against the liability of the can-bodies crowding or bearing one upon the other during their line of travel while being cooled, thereby obviating splattering or spreading of the solder; third, in causing the rotation of the can-bodies upon their own axes during their travel sufficiently fast that by the centrifugal force the solder is held in place and prevented from falling away while in its molten state; fourth, in providing for the quicker and more perfect cooling of the can-bodies, thereby providing a more secure joint or seam; fifth, in applying to the cans while being rotated upon their own axes an artificial air-blast in order to hasten the cooling of the molten solder, and, sixth, in providing oppositely-traveling belts for carrying and rotating the cans upon their own axes.

My invention further consists in providing a simpler, more effective, and less expensive can-body-cooling machine than heretofore known to me.

For a more comprehensive understanding of my invention reference must be had to the accompanying drawings, wherein similar letters of reference are used to denote corresponding parts throughout the entire specification and several views.

Figure 2:
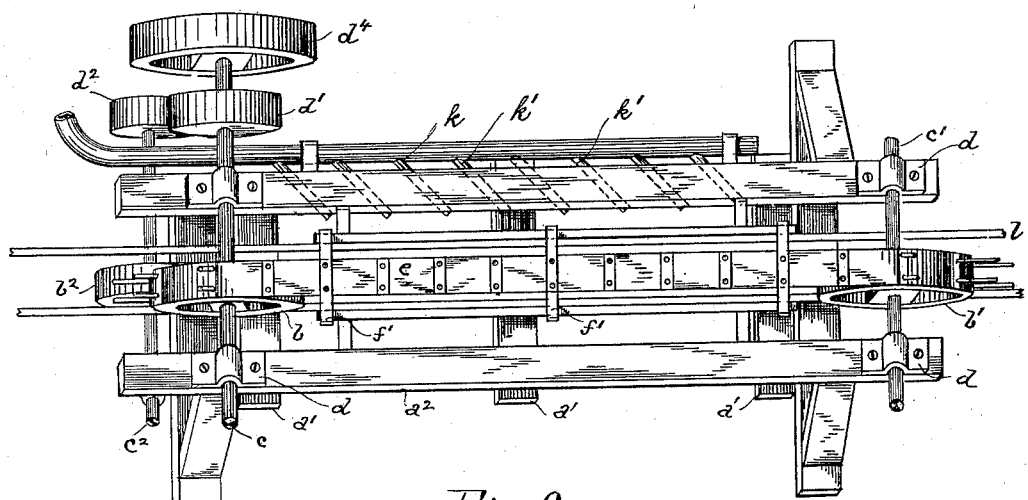
Figure 3:
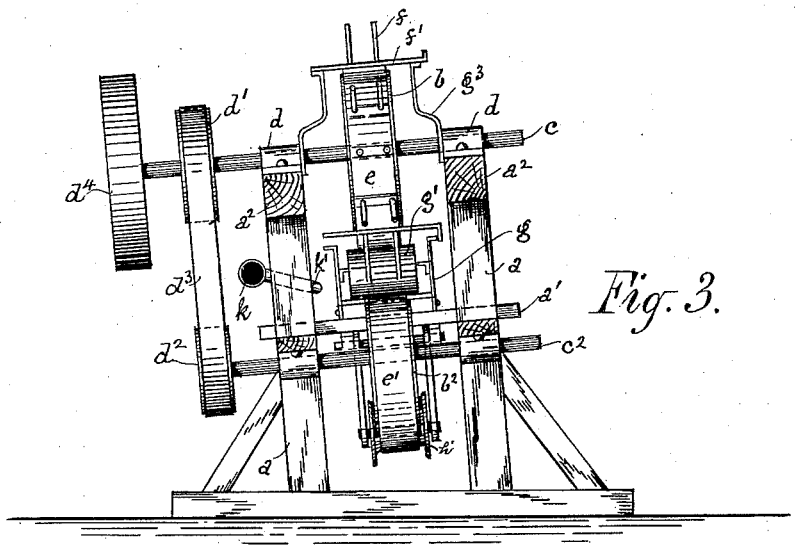
Figure 4:
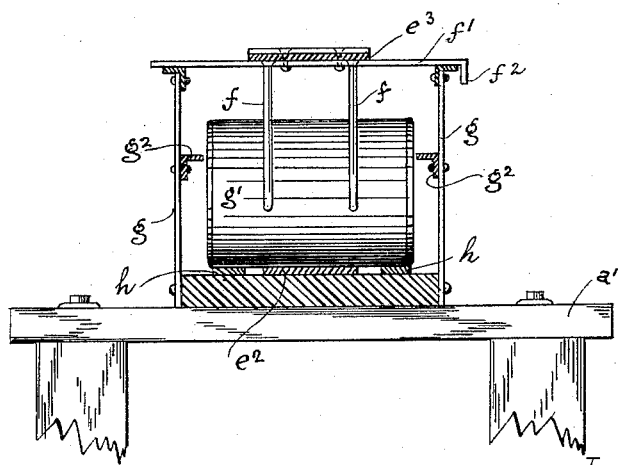

Figure 1 is a side view in elevation; Fig. 2, a top plan view; Fig. 3, an end view, and Fig. 4 a cross-sectional view showing canbody in position.

The frame or table of my machine consists of the vertical, cross, and longitudinal beams $a\ a'\ a^2$. At each end of the frame I secure within suitable bearings $d$ shafts or axles $c\ c'\ c^2\ c^3$, upon which I mount the operating-pulleys $b\ b'\ b^2\ b^3$, one pair of which serves to operate the lower belt and one the upper. The ends of shafts $c\ c^2$ have secured thereon wheels $d'\ d^2$, which are connected by means of belt $d^3$. To the extreme end of axle or shaft $c$ is secured the drive-wheel $d^4$, which is operated by means of any suitable machinery, which may be located at any convenient point. Passing around and over operating-pulleys $b\ b'\ b^2\ b^3$ I secure the endless traveling belts $e\ e'$, which travel one above the other while moving in opposite directions. The upper belt $e$ I provide with a series of fingers or separators $f$, which project at right angles to the belt, and which are designed to maintain the can-bodies separate, so as to prevent contacting with each other during their line of travel at intervals along the belt beneath the fingers $f$.

It will be readily apparent that the fingers $f$ of the upper belt, when the cans are disposed between the under surface thereof and the upper surface of the lower belt, will have the effect of carrying the cans in the same line as the travel of said under surface. This movement, however, is retarded by the oppositely-moving upper surface of the lower belt, which, acting upon the cans, has the effect of rotating the same upon their own axes. In order to facilitate this rotary movement I find it expedient and advantageous to run the belts upon an incline, so that the under surface $e^3$ of belt $e$ will incline downwardly with the line of movement and the upper surface $e^2$ of belt $e'$ will incline upwardly with its line of movement.

At the side of and running parallel with the traveling belt $e'$ is secured the trackways $h$, which serve to maintain the outer ends of the cans in true line with the face of the belt, thereby providing against the tilting or tipping thereof. Beneath the frame I attach the idler $h'$, under which the lower belt $e'$ travels and which serves to maintain the belt taut. Preferably I construct the machine with a pitch toward the soldered end of the can, so that the molten solder may more easily be kept at that end of the can while the same is being cooled, thereby effectually overcoming liability of the solder spreading over the sides of the can, which might possibly ensue if run upon a perfect level trackway.

While I have mentioned the belts $e\ e'$ as rotating in the same direction, still, however, inasmuch as the two faces $e^2\ e^3$, between which the cans rotate, travel in an opposite direction, it is obvious that to all intents and purposes the belts may be said to be oppositely-traveling ones. Consequently whenever the words "oppositely-traveling belts" are used, they are to be understood as oppositely-traveling faces.

Secured to one side and running parallel with the traveling belts is the air-pipe $k$, which is supplied with a series of inwardly-extending arms, branches, or openings $k'$, by means of which a continual supply of cool air is forced against the freshly-soldered ends of the cans during the course of their travel for the purpose of cooling the same thoroughly before reaching the discharge end. Said pipe may be supplied with any number of arms or openings, and should be of such diameter as to admit sufficient air to supply its branches, so as to perfectly cool the cans.

The operation of my machine is as follows: Power being transmitted to the drive-wheel $d^4$ in any well-known manner, the wheels $d'$ $d^2$ are caused to revolve and therewith the pulleys $b\ b^2$, which through the medium of belts $e\ e'$ transmit their motion to pulleys $b'$ $b^3$, over which said belts travel. As the cans $g'$ pass from the solder bath (not shown) they are received upon the trackways $h$ and carried between the oppositely-rotating faces of the belts. By means of the downwardly-extending pins or fingers $f$, secured to the belt $e$, the cans are maintained separate and prevented from crowding upon each other. Inasmuch as the trackways $h$ and belts $e\ e'$ run at an incline, it is obvious that the cans $g'$, in the manner hereinbefore explained, are gradually forced toward the discharge end $l$ of the machine, although by reason of the upper face $e^2$ of belt $e'$ traveling in an opposite direction to face $e^3$ of belt $e$ the cans are somewhat delayed in their travel and caused to rotate upon their own axes. As the cans gradually travel toward the discharge end, they are subjected to the continual air-blast, which is forced directly thereon from the air-pipe $k$ by means of the branch pipes $k'$. By retarding the movement of the cans and causing them to rotate upon their own axes they are subjected to the air-blast sufficiently long to allow of the molten solder becoming thoroughly hardened.

By separating the cans while becoming cooled I not only overcome the liability of the cans bunching together and causing the molten solder to splatter so as to present a rough joint, but also provide against the cans adhering together while being cooled, owing to the solder of one uniting with an impinging can.

I am aware that minor changes may be made in the arrangement of parts and details of construction herein shown and described without necessitating or creating a departure from the nature and scope of my invention.

Having thus described my invention, what I claim as new, and desire to secure protection in by Letters Patent of the United States, is—

1. In a can-cooling machine, the combination of endless traveling belts, the under surface of one and the upper surface of the other moving in opposite directions and arranged to receive the cans therebetween and in contact therewith, one of said belts constructed to carry the can along its path of movement and the other to rotate said cans on their own axes by contact therewith, substantially as set forth.

2. In a can-cooling machine, the combination of a longitudinally-inclined frame, an inclined pathway arranged therein, upper and lower transverse axles journaled in the frame, pulleys mounted on said axles, an endless belt running over the upper pulleys and provided with projecting separating-fingers, and an endless belt passing over the lower pulleys and rotating in a direction to bring the line of movement of its upper surface reverse to the line of movement of the under surface of the upper belt, substantially as set forth.

3. In a can-cooling device, the combination, with the oppositely-traveling belts adapted to receive cans therebetween and cause the rotation upon their own axes, of the air-blast pipe secured to the side thereof and adapted during the rotation of the cans to supply air thereto for cooling the same, substantially as set forth and described.

4. In a can-cooling machine, the combination of a frame having a lateral inclination, a pathway therein having a corresponding inclination, vertical supports projecting upwardly from said pathway, an endless belt, and cross-pieces secured to the belt, having one end flanged downwardly to overlap the upper ends of the supports upon one side and prevent the belt from lateral displacement, substantially as set forth.

5. In a can-cooling machine, the combination of a frame having a lateral inclination, a pathway arranged within said frame having a corresponding inclination, vertical supports projecting upwardly from said pathway, an endless belt, cross-strips secured at intervals along the belt, having one end flanged downwardly to overlap the upper ends of the supports upon one side and prevent lateral displacement of the belt, and projecting separating-fingers secured to the transverse strips, substantially as set forth.

In testimony whereof I affix my signature in presence of two witnesses.

CHARLES B. KENDALL.

Witnesses:
 LEE D. CRAIG,
 N. A. ACKER.